Feb. 6, 1968
C. A. USISKIN
3,367,612
ADJUSTABLE INDICATOR HOLDER
Filed Jan. 11, 1966
2 Sheets-Sheet 2
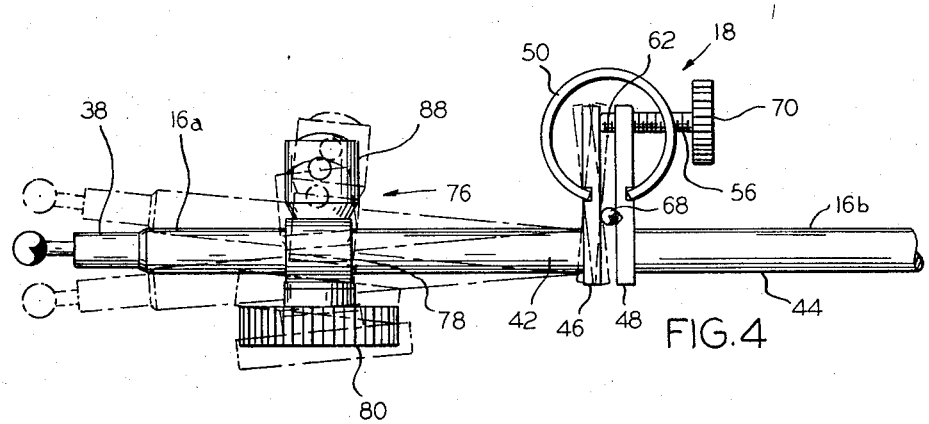
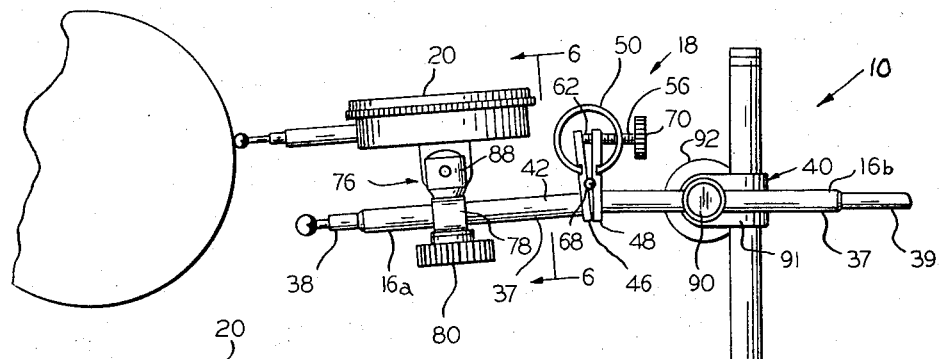
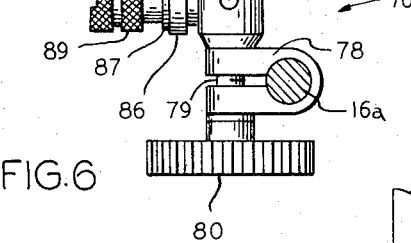
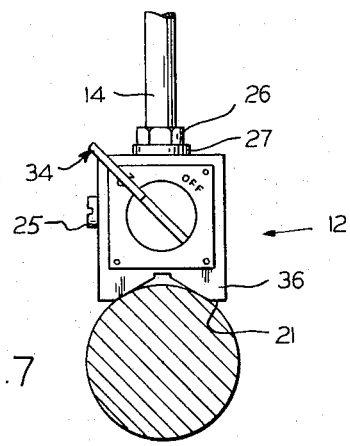
INVENTOR
CHARLES A. USISKIN
BY
*Mullin and Alter*
ATTORNEYS

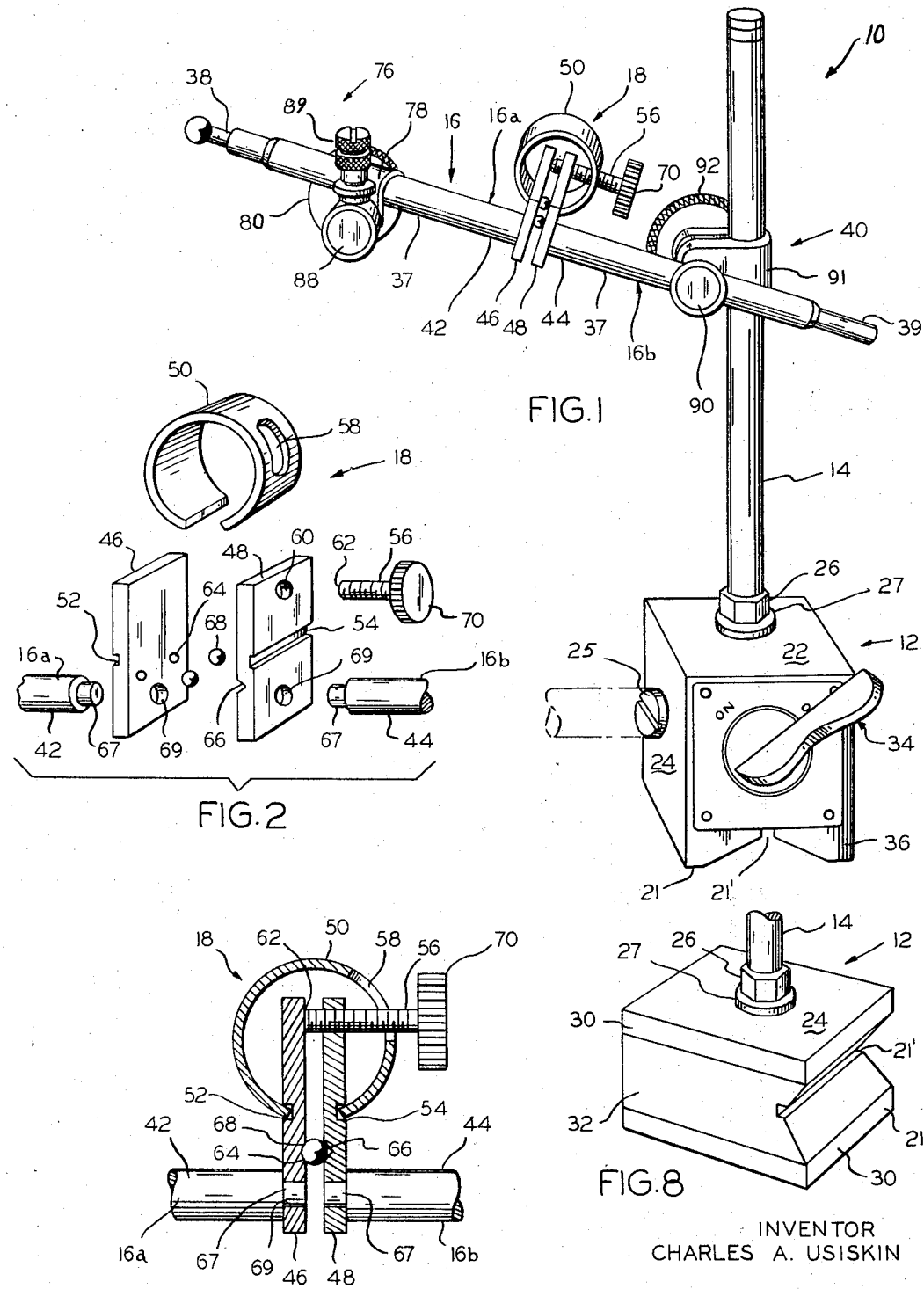

United States Patent Office 3,367,612
Patented Feb. 6, 1968

3,367,612
ADJUSTABLE INDICATOR HOLDER
Charles A. Usiskin, Chicago, Ill., assignor to Enco Manufacturing Company, Chicago, Ill., a corporation of Illinois
Filed Jan. 11, 1966, Ser. No. 519,923
7 Claims. (Cl. 248—124)

ABSTRACT OF THE DISCLOSURE

An indicator holder capable of providing rigid support and fine adjustment of an indicator device mounted thereon has a post mounted on a magnetic base and an indicator arm slidably mounted on said post; said post comprises a plurality of sections connected together by a fine adjustment means for incrementally varying the position of one of the sections of the indicator arm.

---

This invention relates generally to an indicator holder, and more particularly to a fine adjust indicator holder, capable of incrementally varying the position of an indicator device mounted thereon. Still more particularly, this invention pertains to a fine adjust indicator holder with a magnetic base.

In the past, indicator devices such as, for example, those used by tool makers and operators of milling machines, grinders, etc. to determine surface irregularities were, on the most part, unreliable if any high degree of accuracy was required. This was due primarily to the difficulty in being able to precisely control the movement of the indicator device over a particular segment of a surface, especially a curved surface. Hence, for accurate measurements, the manual manipulation of the positioning of the indicator device by itself or when mounted on a holder was, of course, out of the question.

To overcome this inaccuracy problem, various prior indicator holders were devised which included adjustable features. For example, some of these indicator devices comprised an indicator arm whereto an indicator device was attached. The indicator arm was slidably adjustable along a mounting post in order to vary the position of the indicator device. Although an improvement, these adjustable indicator holders did not provide the high degree of control over the mounted indicator device that was required for extremely accurate measurements.

It is therefore a primary object of this invention to provide an adjustable indicator holder that affords precise control of the movement of an indicator device mounted thereon.

It is another object of this invention to provide an adjustable indicator holder having a rigid fine adjustment for moving an indicator device through a finite path in incremental steps.

It is another object to provide an indicator holder having a rigid fine adjustment for moving an indicator device through a finite arcuate path.

Another disadvantage of the prior indicator holders was that they were adjustable, on the most part, only in a vertical plane. Consequently, if the use of the indicator device was necessary in a plane of operation other than in the vertical plane or in more than one plane of operation, the set-up required to secure the indicator holder was usually difficult as well as time consuming.

Hence, it is another important object of this invention to provide an adjustable indicator holder that affords a precise and rigid fine adjustment of an indicator device in a plurality of planes of operation.

It is still another object to provide an adjustable indicator holder that is easily positioned in a new plane of operation and which requires substantially less set-up time than was usually heretofore necessary.

Still another disadvantage with prior indicator holders was the damage which would frequently occur to indicator devices mounted thereon as a result of the holder tipping over or falling from a high level to a hard floor surface. To overcome this problem, the base member was constructed substantially heavier than the combined weight of a conventional indicator and the other elements of the indicator holder. The weighted base member, although reducing occurrences of damage to indicator devices, did not completely alleviate the problem.

Hence, it is still another object of this invention to provide an indicator holder that is capable of rigidly gripping a supporting surface.

It is yet still another object of this invention to provide an indicator holder that is capable of rigidly gripping a supporting surface in opposition to the gravitational force.

It is a primary feature of this invention to provide an indicator holder having a fine adjustment means positioned on an indicator arm which is capable of incrementally controlling the movement of a free end thereof, whereat an indicator device is mounted.

It is another feature to provide a fine adjustment means at a particular point on an indicator arm to effectively control the movement of a free end thereof, irrespective which end is said free end.

It is another feature of this invention to provide an indicator arm having various dimensioned diameter portions to accommodate the mounting structure of conventionally used indicator devices. It is a related feature to position the fine adjustment means at a particular point on the indicator arm to provide incremental control of an indicator device, regardless which of said diameter portions is used for its mounting support.

It is still another feature of this invention to provide a magnetic base member having the capability for rigidly gripping either a curved or flat magnetically attracting surface. It is a related feature to dispose magnetic material on a plurality of surfaces of a base member to enable the plane of operation of an indicator to be conveniently varied.

It is still another feature of this invention to provide a base member having a plurality of coupling means for rigidly receiving the mounting post whereto an indicator arm supporting an indicator device is disposed. In this manner, the indicator holder of this invention is capable of conveniently varying the plane of operation of the indicator device mounted on an indicator arm.

For the purpose of facilitating an understanding of my invention, I have illustrated in the accompanying drawings a preferred embodiment thereof, from an inspection of which, when considered in conjunction with the following description, my invention, mode of construction, assembly and operation, and many advantages, objects, and features should be readily understood and appreciated.

Referring to the drawings in which like characters of reference indicate corresponding similar parts throughout the several figures of the drawing:

FIG. 1 shows an isometric view of the improved indicator holder, embodying the principles of the invention;

FIG. 2 is an exploded view of the fine adjustment means with the elements thereof spaced apart;

FIG. 3 is an enlarged cross-sectional view of the fine adjustment means;

FIG. 4 is a fragmentary sectional view showing various positions within the arc through which the fine adjustment means is capable of incrementally controlling the free end of the indicator arm;

FIG. 5 is a front elevational view of the indicator holder and showing the indicator device in contact with a curved edge;

FIG. 6 is an enlarged cross-sectional view taken on the plane of line 6—6 in FIG. 5, and viewed in the direction indicated;

FIG. 7 is a fragmentary view showing the substantially V-shaped magnetic base member gripping a curved surface; and FIG. 8 is a fragmentary isometric view of the base member and illustrating the magnetic attracting material on two sides thereof.

Referring now to the drawings, the reference character 10 indicates generally an adjustable indicator holder embodying the principles of the invention. The adjustable indicator holder 10 comprises generally a base member 12, a mounting post 14, an indicator arm 16 split into sections 16a and 16b and a fine adjustment means 18 for providing sensitive control of an indicator device 20 mounted on the free end of the indicator arm 16.

The base member 12 may have any suitable configuration but in the embodiment shown, the same comprises a substantially box-like configuration with the bottom side 21 thereof having a substantially V-shaped groove 21' centered therein (FIG. 1). The top side 22 of the base member includes a socket (not shown) which may be threaded for engagement with a threaded bottom end of mounting post 14 (see FIGS. 1 and 5) and tightly secured therein by nut 26 and washer 27. Therefore, the cooperation of the threaded socket with the threaded bottom end of the post affords a coupling means for connecting the mounting post to the base.

As illustrated in FIG. 8, the mounting post 14 may be similarly associated with the side wall 24 of base member 12 after the screw insert 25 (shown in FIG. 1) has been removed. Thus, the plane of operation of the indicator device may be conveniently varied by re-positioning of the mounting post.

With reference again to FIG. 8, a magnetic material 30 is disposed on the V-shaped bottom side 21 of base members 12 and on the top and bottom edges of the back side 32 thereof. The "on-off" switch 34 on the front side 36 controls the magnetic field for the magnetic material 30. Thus, the indicator holder 10 may be fixedly attached to a magnetically attractive surface either from the back side 32 or the bottom side 21. Hence, the plane of operation of the indicator device 20 may be conveniently varied although the mounting post 14 remains secured to the top side 22 of the base member.

Note in FIG. 8, the substantially V shape of the magnetic material 30 disposed on the V-shaped portion of bottom side 21 of base 12. With this construction, bottom side 21 is readily adaptable for magnetically gripping a curved magnetically attracting surface as well as a flat magnetically attracting surface (see FIGS. 5 and 7). Moreover, base member 12 may be constructed to have substantial weight so that it will firmly lie on a surface even though the surface is not magnetically attractive.

Indicator arm 16 is slidably associated with the mounting post 14 and fixedly attached thereto at a predetermined point by a locking clamp member 40 (FIGS. 1 and 5). The capability to readily vary the position of indicator arm 16 along mounting post 14 provides a coarse adjustment of the position of an indicator device 20, mounted at the free end of the indicator arm.

Indicator arm 16 includes circular cross-sectional portions having various diameter values. As shown in FIGS. 1 and 5, the main body portion 37 of sections 16a and 16b has a greater cross-sectional area than the respective outer ends 38, 39. With these various diameter portions on the indicator arm, indicator devices requiring different sized mounting stems may be readily adapted for use with the indicator holder herein.

The inner ends 42, 44 of sections 16a, 16b of the indicator arm 16 (see FIGS. 1 and 3) are fixedly associated with each other by the fine adjustment means 18. As shown in FIG. 5, section 16a supports the indicator device 20 and section 16b is securely attached to the mounting post 14. However, either section 16a or 16b may be secured to mounting post 14 and the other section would then serve as the support for the indicator device.

With particular reference to FIGS. 2 and 3, the fine adjustment means 18 comprises a pair of plate members 46, 48 with the inner surfaces thereof facing each other. Plate members 46, 48 are associated with a resilient means, such as a substantially circular clamp 50. Circular clamp 50 is normally biased inwardly with the ends thereof disposed within grooves 52, 54 on the outer surfaces of plate members 46, 48. A screw 56 extends through an opening 58 of clamp 50 and is threadedly engaged within a threaded aperture 60 of plate member 48. The tip 62 of screw 56 is operatively in contact with plate member 46.

Plate member 46 includes a pair of substantially circular recesses 64 in the inner surface thereof, and opposed thereto within the inner surface of plate member 48 is a substantially V-shaped recess 66 that extends laterally across plate member 48. Seated within each circular recess 64 and the V-shaped recess 66 are ball bearings 68 which act as a fulcrum point for the pivotal movement of the plate members 46, 48. Inner ends 42, 44 of sections 16a, 16b of the indicator arm include reduced diameter portions 67 (see FIGS. 2 and 3) which may be press fitted or threadedly engaged within cavities 69 of plate members 46, 48. In this manner sections 16a, 16b may be rigidly associated with the fine adjustment means 18.

With particular reference to FIGS. 4 and 5, the operation of the fine adjustment means 18 will now be described. Since section 16b of indicator arm 16 is securely attached to mounting post 14, only section 16a whereto the indicator device is mounted, responds to the adjustment of the fine adjustment means 18. The fine adjustment means is capable of incrementally and rigidly varying section 16a within a finite arcuate path defined by a first and second extreme position.

The fine adjustment means 18 is at a first extreme position after the head 70 of screw 56 is revolved so that the tip 62 thereof offers substantially no pressure against plate member 46 and the resilient force from the circular clamp 50 forces the lateral end of plate member 46 into contact with plate member 48, and the opposite lateral end thereof to be spaced from plate member 48.

As the screw 56 is revolved from said first extreme position to cause the tip 62 thereof to forcibly abut against the inner surface of plate member 46, the end of plate member 46 in contact with tip 62 moves outwardly away from plate member 48, and the opposite end thereof, due to the pivoting on ball bearings 68, moves inwardly toward the plate member 48. In response to this pivotal movement of plate member 46, section 16a of indicator arm 16 correspondingly travels in an arcuate path as illustrated in FIG. 4.

The fine adjustment means 18 is at its second extreme position which is shown in FIG. 5, when the head 70 of screw 56 has been revolved sufficiently so that the lateral end of plate member 46 which was spaced from plate member 48 in the above described first extreme position is in contact with plate member 48, and the opposite lateral end of plate member 46 is spaced from plate member 48. Moreover, tip 62 is forcibly abutting against the inner surface of plate member 46.

It should be particularly noted that the fine adjustment means 18 is positioned so that it is capable of providing a rigid and fine adjustment control regardless which diameter portions of indicator arm 16 is used to support the indicator devices 20. To accomplish this, it has been found that a desirable location for the fine adjustment means 18 is substantially in the center of the indicator arm 16. In this manner, the fine adjustment means 18 is at all times near to the indicator device 20.

As shown in FIGS. 5 and 6, a swivel adapter 76 may be associated with an indicator device 20 and the indicator arm 16. The swivel adapter 76 comprises a substantially U-shaped bracket 78, a shaft 79 threaded on one end to receive a threaded knob 80, and a shoulder 88 on the opposite end thereof. A pin (not shown) is releasably secured at one end to shoulder 88. A lug 86 from an indicator 20 may be placed over the pin. The indicator 20 is secured between washer 87 and shoulder 82 by tightening nut 89.

The U-shaped bracket 78 of swivel adapter 76 is preferably sized to fit the main body portions 37 of sections 16a, 16b of arm 16 and to be slidably disposed thereon until fixedly positioned by tightening knob 80. When bracket 78 is not tightly associated with arm 16, the indicator device may be revolved within a plane perpendicular to shaft 79 in order to vary the position of the same. When the indicator device is positioned at a selected point, it is merely required to secure the U bracket 78 by tightening knob 80.

Locking clamp member 40 which secures indicator arm 16 to mounting post 14 may be constructed similarly to the swivel adapter 76 above described. As shown in FIGS. 1 and 5, the locking clamp member 40 includes a holder portion 90 for receiving the indicator arm 16, a U clamp 91, a knob member 92 threadedly associated with a threaded shaft (not shown) which passes through the U clamp 91. The tightening of knob member 92 tightens the clamp 91 against the mounting post 14 and secures the indicator arm at a selected level. The loosening of knob 92 permits the indicator arm to be moved along the mounting post 14 to a new selected level or to be revolved within a plane substantially perpendicular to the shaft (not shown) extending through U clamp 91, to thereby change the angular position of the indicator arm 16 with respect to mounting post 14.

It has been found that the indicator holder 10 herein is adaptable for use with most conventional indicator devices if the outer ends 38, 39 and the main body portions 37 (see FIGS. 1 and 5) have diameter values of 5/16", 7/32" and 3/8" respectively. Moreover, the swivel adapter 76 may be dimensioned for attachment to lug back indicator devices and also indicator devices with 1/4" and 5/32" mounting stems. However, the aforementioned diameter values should in no way act as a limitation on the invention herein.

From the foregoing description, it should be apparent that a novel adjustable indicator holder has been provided which is capable of providing a rigid and fine adjustment of the position of an indicator device mounted thereon. Moreover, the fine adjustment means 18 of the indicator holder 10 is positioned on the indicator arm 16 to provide substantially the same control at the free end thereof whether the indicator device is mounted on one section of the indicator arm or on the other section thereof. Consequently, the fine adjustment means is at all times close to the indicator device.

Furthermore, difficult and time consuming set-ups for attaching the indicator device to the indicator holder are avoided by having an indicator arm with various sized diameter portions to serve as mounting stems for the conventionally used indicator devices.

Also, some indicator devices which are not easily mountable on the indicator arm may be associated thereto by the swivel adapter 76.

The magnetic material 30 on the bottom side 21 and on the back side 32 of base 12 enables the adjustable indicator holder to be securely positioned on a magnetic attracting surface. Also, a V-shaped back side adapts the holder for curved surfaces. The magnetic material on more than one surface of the base member enables the plane of operation of the indicator device to be easily varied.

The base member 12 also includes sockets on various sides thereof for engaging the bottom end of the mounting post. In this manner also, the plane of operation of the indicator device may be varied.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An indicator holder for supporting and controlling the movement of an indicator device comprising:
   a mounting post;
   an indicator arm having a pair of split apart sections with inner ends, said arm being slidably associated with said post;
   means for releasably securing one of said sections to a pre-selected point along said mounting post, the other of said sections supporting said indicator device; and
   a fine adjustment means fixedly associated with an inner end of each of said sections and having the capability for incrementally varying the position of said section of the indicator arm supporting the indicator device, said fine adjustment means comprising:
      a pair of plate members, each of said plate members being fixedly connected to said inner end of one of said sections;
      a fulcrum associated with each of said plate members to provide a pivot point for the same, said fulcrum being positioned between opposed surfaces of said plate members;
      resilient means associated with said plate members and normally biased to position the section of said arm at the free end thereof into one of two extreme positions; and
      a fine adjust control for incrementally varying said last-mentioned section between said two extreme positions.

2. An indicator holder as defined in claim 1, wherein:
   said resilient means comprises a substantially circular resilient clamp with each end thereof fixedly associated with a plate member, said clamp being normally biased inwardly to urge said section at the free end of said indicator arm toward one of said extreme positions;
   said fulcrum includes at least one ball bearing seated in opposed recesses within the inner surfaces of said plate members, said resilient clamp fixedly maintaining said one ball bearing within said recesses; and
   said fine adjust control includes a screw, an opening within said clamp and a threaded aperture through one of said plate members, said screw passing through said opening and threadedly through the aperture of said one plate member to have the tip thereof in operatively abutting contact with the other said plate member, the rotation of said screw causing said section of said arm at the free end thereof to incrementally and arcuately move between said extreme positions as the corresponding plate member is caused to pivot on said ball bearing.

3. An indicator holder as defined in claim 2, wherein:
   the outer surface of each of said plate members includes grooves for receiving the ends of said circular clamp;
   said recess in one of said inner surfaces is a circular recess and said recess in the other said inner surface is a laterally extending substantially V-shaped recess;
   said section at the free end of said indicator arm is in one of said extreme positions when the tip of said screw is applying substantially no pressure against the plate member in contact therewith and the lateral end of said plate members adjacent said screw are in contact with each other and the opposite lateral ends of said plate members are spaced apart;

said section for supporting said indicator holder is in the other of said extreme positions when said screw cooperating with the threaded aperture forces the lateral ends of said plate members adjacent thereto to be sufficiently spread apart to cause the opposite lateral ends to contact each other, said fine adjust control being capable of incrementally varying the position of the section at the free end of said indicator arm between said two extreme positions.

4. An indicator holder as defined in claim 1 which further includes:

a base member having a plurality of coupling means, each of said coupling means being capable of releasably securing said mounting post to said base to vary the plane of operation for said indicator device mounted to said indicator arm.

5. An indicator holder as defined in claim 4, wherein: one of the surfaces of said base member includes a substantially V-shaped groove, the surface defining said groove including magnetic material to enable said indicator holder to be securely positioned on a curved magnetically attracting surface.

6. An indicator holder as defined in claim 4, wherein: said base member includes:

magnetic material on at least two surfaces of said base member to enable the plane of operation of said indicator device to be varied; and an "on-off" switch to control the magnetic field for said magnets.

7. An indicator holder as defined in claim 4 further includes:

a swivel adapter fixedly attached to an indicator device and secured to the section of the said indicator arm for supporting an indicator device, said swivel adapter being capable of revolving said indicator device to vary the angular position of the same with respect to said indicator arm, said swivel adapter attaching indicator devices to said indicator arm that could not easily be directly attached thereto.

References Cited

UNITED STATES PATENTS

| | | | |
|---|---|---|---|
| 2,280,437 | 4/1942 | Levesque | 248—206 X |
| 2,721,390 | 10/1955 | Pasturczak | 33—172 |
| 2,888,617 | 5/1959 | Baunet. | |
| 2,911,178 | 11/1959 | Toffe | 248—291 |
| 3,231,228 | 1/1966 | Gershman | 287—14 |

ROY D. FRAZIER, *Primary Examiner.*

J. FRANKLIN FOSS, *Assistant Examiner.*